(12) United States Patent
Wielockx et al.

(10) Patent No.: US 9,380,793 B2
(45) Date of Patent: Jul. 5, 2016

(54) ARTIFICIAL FOOD CASING COMPRISING A TRACEABILITY CODE, METHOD FOR MANUFACTURING AND METHOD OF TRACING THEREOF

(71) Applicant: ViskoTeepak Belgium NV, Lommel (BE)

(72) Inventors: Pierre Wielockx, Lommel (BE); Johan Quinten, Lommel (BE); Jo Maes, Lommel (BE)

(73) Assignee: ViskoTeepak Belgium NV, Lommel (BE)

( * ) Notice: Subject to any disclaimer, the term of this patent is extended or adjusted under 35 U.S.C. 154(b) by 0 days.

(21) Appl. No.: 14/493,762

(22) Filed: Sep. 23, 2014

(65) Prior Publication Data

US 2015/0083809 A1    Mar. 26, 2015

(30) Foreign Application Priority Data

Sep. 23, 2013  (EP) ..................... 13185539

(51) Int. Cl.
*G06K 7/10*    (2006.01)
*A22C 13/00*   (2006.01)
*D21H 27/10*   (2006.01)
*D21H 27/30*   (2006.01)
*D21H 13/08*   (2006.01)
*D21H 21/48*   (2006.01)
*G06K 1/12*    (2006.01)
*G06K 7/12*    (2006.01)

(52) U.S. Cl.
CPC ............. *A22C 13/0013* (2013.01); *A22C 13/00* (2013.01); *D21H 13/08* (2013.01); *D21H 21/48* (2013.01); *D21H 27/10* (2013.01); *D21H 27/30* (2013.01); *G06K 1/121* (2013.01); *G06K 7/12* (2013.01); *A22C 2013/0053* (2013.01); *A22C 2013/0079* (2013.01); *A22C 2013/0096* (2013.01)

(58) Field of Classification Search
CPC ................................. G06K 1/121; G06K 7/12
USPC ......................................................... 235/468
See application file for complete search history.

(56) References Cited

U.S. PATENT DOCUMENTS

| | | | |
|---|---|---|---|
| 5,565,228 A * | 10/1996 | Gics .............................. | 426/107 |
| 6,200,510 B1 | 3/2001 | DuCharme, Jr. et al. | |
| 2010/0008561 A1* | 1/2010 | Matacotta et al. ............ | 382/143 |
| 2012/0052223 A1* | 3/2012 | Wielockx et al. ............ | 428/34.8 |
| 2014/0171600 A1* | 6/2014 | Hasegawa et al. ............ | 525/538 |

OTHER PUBLICATIONS

Extended European Search Report for corresponding European Patent Application No. 13185539.7 mailed Feb. 12, 2014.

* cited by examiner

*Primary Examiner* — Seung Lee
(74) *Attorney, Agent, or Firm* — Merchant & Gould P.C.

(57) ABSTRACT

An artificial food casing includes a marking with a traceability code, wherein the marking includes an ultraviolet-detectable component.

9 Claims, No Drawings

ARTIFICIAL FOOD CASING COMPRISING A TRACEABILITY CODE, METHOD FOR MANUFACTURING AND METHOD OF TRACING THEREOF

This application claims benefit of Ser. No. 13185539.7, filed 23 Sep. 2013 with the European Patent Office and which application is incorporated herein by reference. To the extent appropriate, a claim of priority is made to the above disclosed application.

FIELD OF THE INVENTION

The invention relates to an artificial food casing. The invention also relates to a method for manufacturing and a method for tracing said artificial food casing.

BACKGROUND OF THE INVENTION

Food casings based on artificial materials such as cellulose, plastic and textile have been used for decades for the production of food products such as various types of sausages.

Current food safety standards, such as the European packaging directive, require that such food casings be provided with a traceability code that allows the food casings to be traced for safety reasons. Such a traceability code may contain information concerning e.g. units, batches, production dates, or equipment used for production.

However, it has been found that such traceability codes may cause unforeseen problems with end users of the food casings containing such traceability codes. For instance, consumers of the final food product packaged in a food casing containing a marking with a traceability code may be confused to falsely believe that the marking with a traceability code indicates shelf life of the final food product. This may lead to reduced customer acceptance or unnecessary returns or disposals of the final food product. A conceivable solution to this problem could be e.g. a marking with a traceability code, such as a label, that could be removed from the food casing before the final food product packaged in the food casings is provided to end users. However, such removable markings with traceability codes are difficult to implement in a practical way for food casings that undergo various processing steps during their manufacture and use. Furthermore, a removable marking with a traceability code is not desirable when the food casing should be traceable throughout its life cycle.

SUMMARY

The invention relates to an artificial food casing.

The invention further relates to a method for manufacturing an artificial food casing.

The invention further relates to a method for tracing an artificial food casing.

DETAILED DESCRIPTION

Reference will now be made in detail to the embodiments of the present invention.

The present invention relates to an artificial food casing comprising a marking with a traceability code, wherein the marking comprises an ultraviolet-detectable component.

The artificial food casing according to one or more embodiments of the invention provides a number of advantages. The marking with a traceability code can be easily visualized by illuminating the artificial food casing with an ultraviolet light source. The marking with a traceability code may be disposed on the surface of the artificial casing or embedded in the artificial food casing.

The marking with a traceability code may be applied, e.g. printed, to the artificial food casing using a composition comprising an ultraviolet-detectable component. The composition may be e.g. a printing ink or any other composition described below.

The ultraviolet-detectable component or the composition comprising an ultraviolet-detectable component applied, e.g. printed, to the artificial food casing thus forms a marking comprising a traceability code. The marking may also comprise or convey further information such as shelf life or freshness date or an advertisement.

The marking with a traceability code may be applied or printed e.g. by printing using an ink jet printer or by printing using any other method that leads to the marking with a traceability code being applied to the artificial food casing or any surface thereof.

The traceability code may contain or convey information concerning e.g. the unit, batch, production date, or equipment used for production of the artificial food casing.

In this context, the term "artificial food casing" should be understood as referring to a food casing suitable for a food product.

In one embodiment, the artificial food casing comprises regenerated cellulose.

In one embodiment, the artificial food casing is a cellulose-based food casing.

In one embodiment, the artificial food casing is a tubular cellulose-based food casing.

In one embodiment, the artificial food casing comprises a fibrous reinforcement. The fibrous reinforcement may be tubular.

In one embodiment, the artificial food casing comprises a fibrous reinforcement comprising an inside surface and an outside surface; and an outside layer on the outside surface of the fibrous reinforcement and/or an inside layer on the inside surface of the fibrous reinforcement; and the outside layer and/or the inside layer comprises regenerated cellulose.

In one embodiment, the artificial food casing comprises a fibrous reinforcement comprising an inside surface and an outside surface; and an outside layer on the outside surface of the fibrous reinforcement and/or an inside layer on the inside surface of the fibrous reinforcement, wherein the outside layer and/or the inside layer comprises regenerated cellulose; and wherein the marking with a traceability code is applied or printed on the inside surface and/or the outside surface of the fibrous reinforcement.

A tubular fibrous reinforcement may be formed by joining the opposite ends of a fibrous reinforcement; overlapping opposite ends of the fibrous reinforcement may thus form a seam in the tubular fibrous reinforcement. In embodiments in which the fibrous reinforcement is a tubular fibrous reinforcement thus formed, the marking with a traceability code may be applied or printed on the seam of the tubular fibrous reinforcement.

This embodiment has the advantage that the marking with a traceability code is embedded inside the regenerated cellulose, and thus it is not susceptible e.g. to surface scratching or subsequent processing steps which could harm the marking with a traceability code or the ultraviolet-detectable component or separate it from the artificial food casing. This may be particularly beneficial for a marking with a traceability code comprising an ultraviolet-detectable component which may be challenging to detect in practical circumstances.

In one embodiment, the cellulose-based food casing is a single layer viscose casing or a double layer viscose casing.

In one embodiment, the artificial food casing comprises plastic.

In this context, the term "plastic" should be understood as referring to any type of plastic suitable for use in a food casing. Plastics such as polyamides or PVDC and mixtures thereof are commonly used in food casings.

In one embodiment, the artificial food casing comprises textile.

In this context, the term "textile" should be understood as referring to a textile comprising e.g. natural fibers, linen, silk, wool, modified natural fibers, synthetic fibers, or any mixtures thereof.

In one embodiment, the artificial food casing is tubular.

In this context, the term "ultraviolet-detectable component" should be understood as referring to any component that emits visible light when illuminated with an ultraviolet light source. It may be e.g. a pigment, a dye, an ink, a chemical compound, a fluorophore or any combination thereof, provided that it is ultraviolet-detectable.

In this context, the term "ultraviolet light source" should be understood as referring to any artificial source of ultraviolet light. Such an ultraviolet light source may be e.g. an ultraviolet lamp or a blacklight, a fluorescent lamp, a gas-discharge lamp, a LED or a laser emitting ultraviolet light.

Visible light emitted by the ultraviolet-detectable component may be detected visually, e.g. by an operator, or by a sensor.

In one embodiment, the ultraviolet-detectable component is photoluminescent under ultraviolet light.

In one embodiment, the ultraviolet-detectable component is fluorescent under ultraviolet light.

In one embodiment, the ultraviolet-detectable component is an ultraviolet-detectable pigment.

In one embodiment, the marking with a traceability code and/or the ultraviolet-detectable component is essentially invisible under daylight or ambient light conditions.

In one embodiment, the ultraviolet-detectable component is essentially colourless.

In one embodiment, the ultraviolet-detectable component is essentially colourless under daylight or ambient light conditions.

In this context, the term "daylight" should be understood as referring to direct or indirect sunlight outdoors during the daytime.

In this context, the term "ambient light conditions" should be understood as referring to general illumination in a room that is available naturally, e.g. daylight, or by artificial light, e.g. by light provided by lightbulbs or fluorescent lamps.

The exact chemical composition of the ultraviolet-detectable component is not particularly limited. Various ultraviolet-detectable components are commercially available, for instance fluorescent pigments sold under the trade names Lumilux (e.g. Lumilux Yellow-orange CD 130, Red CD 106, Red CD 331, Blue CD 164, CWR C 120 R or Yellow CD 382) and RadGlo. The ultraviolet-detectable component may be selected so that it fulfills any requirements concerning food safety.

Furthermore, compositions such as inks suitable for applying or printing comprising an ultraviolet detectable component are commercially available. One such suitable ink composition is provided by Weber Marking under the product name UVINV (72500021).

In one embodiment, the ultraviolet-detectable component is an ultraviolet-detectable pigment.

In one embodiment, the ultraviolet-detectable pigment is an organic ultraviolet-detectable component or pigment.

In one embodiment, the ultraviolet-detectable component is a polyester/amide based component.

In one embodiment, the ultraviolet-detectable component is an optical brightener.

Optical brighteners, also known as optical brightening agents or fluorescent whitening agents, are typically dyes that absorb ultraviolet light and emit visible light in the blue region, typically at a wavelength in the range of 400 to 470 nm. Various optical brighteners are available, e.g. various benzoxazole, including bis(benzoxazole) and butylbenzoxazole, derivatives, stilbene derivatives and ethenyl derivatives. This embodiment has the advantage that optical brighteners are bright, readily available and costeffective. Yet they are colourless or essentially colourless and cannot be detected with the human eye without illumination with an ultraviolet light source.

In one embodiment, the optical brightener is a benzoxazole derivative.

In one embodiment, the optical brightener is 2,5-thiophenediylbis(5-tert-butyl-1,3-benzoxazole) (benzoxazole, 2,2'-(2,5-thiophenediyl)bis[5-(1,1-dimethylethyl)]-).

In one embodiment, the ultraviolet-detectable component is a fluorescent whitening agent.

In one embodiment, the ultraviolet-detectable component is an ultraviolet-detectable pigment, an optical brightener, a fluorescent whitening agent or any combination thereof.

In one embodiment, the marking with a traceability code is applied or printed on the outside surface and/or on the inside surface of the artificial food casing.

In one embodiment, the artificial food casing comprises a plurality of markings with a traceability code disposed at spaced positions along the length of the artificial food casing. The plurality of markings with a traceability code may also be disposed at equally spaced positions along the length of the artificial food casing. This allows using the plurality of markings with a traceability code for measurement purposes, e.g. tracing the amount of food product or the number of food products, e.g. individual sausages, packaged in the artificial food casing.

In one embodiment, the artificial food casing comprises a fibrous reinforcement comprising an inside surface and an outside surface; and an outside layer on the outside surface of the fibrous reinforcement and/or an inside layer on the inside surface of the fibrous reinforcement; wherein the outside layer and/or the inside layer comprises regenerated cellulose; and wherein a plurality of markings with a traceability code are applied or printed at spaced positions along the length of the inside surface and/or the outside surface of the fibrous reinforcement.

The invention also relates to a method for manufacturing an artificial food casing according to one or more embodiments of the invention, which method comprises applying a marking with a traceability code on the artificial food casing, wherein the marking comprises an ultraviolet-detectable component.

In one embodiment, the method comprises printing a marking with a traceability code on the artificial food casing, wherein the marking comprises an ultraviolet-detectable component.

In one embodiment, the marking with a traceability code is printed onto a surface of the artificial food casing. In the context of said method, the term "artificial food casing according to one or more embodiments of the invention" may refer to any of the embodiments of an artificial food casing comprising a marking with a traceability code described herein. Furthermore, the ultraviolet-detectable component may be any ultraviolet-detectable component described herein.

The marking with a traceability code may be applied or printed on the outside surface and/or the inside surface of the artificial food casing. It may also be applied or printed on a surface that is embedded in the artificial food casing during subsequent manufacturing steps.

The marking with a traceability code may be applied or printed to the artificial food casing using a composition comprising an ultraviolet-detectable component. The composition may be e.g. a printing ink.

In one embodiment, the method comprises
providing a fibrous reinforcement comprising an inside surface and an outside surface;
applying or printing a marking with a traceability code on the inside surface and/or the outside surface of the fibrous reinforcement, wherein the marking comprises an ultraviolet-detectable component; and
coating the inside surface and/or the outside surface of the fibrous reinforcement with viscose.

This embodiment has the advantage that applying or printing the marking with a traceability code can be integrated into the process of manufacturing the artificial food casing, e.g. in an online process, and a separate offline step of applying or printing the marking after the artificial food casing is manufactured is not required. Thus the method is costeffective. Furthermore, since the marking with a traceability code is embedded inside the regenerated cellulose, it is not susceptible e.g. to surface scratching or subsequent processing steps which could harm or separate the marking or the ultraviolet-detectable component. This may be particularly beneficial for a marking comprising an ultraviolet-detectable component which may be challenging to detect in practical conditions.

The method typically further comprises coagulating and washing the fibrous reinforcement coated with viscose so as to obtain a cellulose-based food casing. As a skilled person would understand, the cellulose-based food casing thus obtained comprises regenerated cellulose.

A tubular fibrous reinforcement may be formed by joining the opposite ends of a fibrous reinforcement; overlapping opposite ends of the fibrous reinforcement may thus form a seam in the tubular fibrous reinforcement. In embodiments in which the fibrous reinforcement is a tubular fibrous reinforcement thus formed, the marking with a traceability code may be applied or printed on the seam of the tubular fibrous reinforcement.

In one embodiment, a plurality of markings with a traceability code are applied or printed at spaced positions along the length of the artificial food casing.

In one embodiment, a plurality of markings with a traceability code are applied or printed at spaced positions along the length of the fibrous reinforcement prior to coating the fibrous reinforcement with viscose.

The invention further relates to an artificial food casing obtainable by the method according to one or more embodiments of the invention.

The invention further relates to a method for tracing an artificial food casing according one or more embodiments of the invention, wherein the method comprises illuminating the artificial food casing with an ultraviolet light source so as to detect the marking with a traceability code.

The invention further relates to the use of an ultraviolet-detectable component for marking an artificial food casing with a traceability code.

The embodiments of the invention described hereinbefore may be used in any combination with each other. Several of the embodiments may be combined together to form a further embodiment of the invention. A product, a method or a use, to which the invention is related, may comprise at least one of the embodiments of the invention described hereinbefore.

EXAMPLES

In the following, the present invention will be described in more detail. The description below discloses some embodiments and examples of the invention in such detail that a person skilled in the art is able to utilize the invention based on the disclosure. Not all steps of the embodiments are discussed in detail, as many of the steps will be obvious for the person skilled in the art based on this specification. The following examples were carried out in a small-scale testing laboratory; however, a person skilled in the art is able to scale the examples as desired.

Example 1

A tubular cellulose-based food casing was manufactured by printing a marking with a traceability code on the outside surface of a tubular fibrous reinforcement (a paper fleece) and subsequently coating the inside and outside surfaces of the fibrous reinforcement with viscose using known methods. The marking with a traceability code was printed using an ink jet printer (HP 72400150 from Weber Marking) and ultraviolet-detectable ink (UVINV, 72500021 from Weber Marking). The tubular cellulose-based food casing was subsequently treated by coagulation, regeneration, washing and drying steps using known methods.

The marking with a traceability code was not visible in daylight, but was clearly visible when the tubular cellulose-based food casing obtained was illuminated using an ultraviolet light source.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. An artificial food casing comprising a marking with a traceability code, wherein the marking comprises an ultraviolet-detectable component;
   wherein the artificial food casing comprises a fibrous reinforcement comprising an inside surface and an outside surface; and an outside layer on the outside surface of the fibrous reinforcement and/or an inside layer on the inside surface of the fibrous reinforcement, wherein the outside layer and/or the inside layer comprises regenerated cellulose; and wherein the marking with a traceability code is applied or printed on the inside surface and/or the outside surface of the fibrous reinforcement; and
   wherein the artificial food casing is tubular.

2. The artificial food casing according to claim 1, wherein the ultraviolet-detectable component is photoluminescent or fluorescent under ultraviolet light.

3. The artificial food casing according to claim 1, wherein the ultraviolet-detectable component is an ultraviolet-detectable pigment, an optical brightener, a fluorescent whitening agent or any combination thereof.

4. The artificial food casing according to claim 1, wherein the marking is essentially invisible under daylight or ambient light conditions.

5. The artificial food casing according to claim 1, wherein the artificial food casing comprises a plurality of markings with a traceability code disposed at spaced positions along the length of the artificial food casing.

6. A method for manufacturing an artificial food casing wherein the artificial food casing comprises a fibrous reinforcement comprising an inside surface and an outside surface and a marking with a traceability code, which method comprises:
   applying or printing a marking with a traceability code on the inside surface and/or the outside surface of the fibrous reinforcement of the artificial food casing, wherein the marking comprises an ultraviolet-detectable component; and
   coating the inside surface and/or the outside surface of the fibrous reinforcement with viscose.

7. The method according to claim 6, wherein the method comprises printing a marking with a traceability code on the artificial food casing, wherein the marking comprises an ultraviolet-detectable component.

8. The method according to claim 6, wherein the method further comprises coagulating and washing the fibrous reinforcement coated with viscose so as to obtain a cellulose-based food casing.

9. The method according to claim 6, wherein a plurality of markings with a traceability code are applied or printed at spaced positions along the length of the artificial food casing.

* * * * *